United States Patent Office 2,951,884
Patented Sept. 6, 1960

2,951,884
1,2,4-TRIVINYLBENZENE AND PROCESS FOR PREPARING THE SAME

Fred Wayne Hoover, Wilmington, Del., assignor to E. I. du Pont de Nemours and Company, Wilmington, Del., a corporation of Delaware No Drawing. Filed Jan. 16, 1959, Ser. No. 787,140

3 Claims. (Cl. 260—669)

This invention relates to a new composition of matter and to its preparation. More particularly it is an object of this invention to prepare 1,2,4-trivinylbenzene having utility as a cross-linking agent. It is a further object to prepare such compound by the trimerization of monovinylacetylene. These and other objects will become apparent from the following disclosure.

This application is a continuation-in-part of my copending U.S. application Serial No. 656,758, filed May 3, 1957, now abandoned.

Monovinylacetylene is a low cost bifunctional chemical whose principal use is as a precursor of the first practical synthetic rubber, poly(2-chloro-1,3-butadiene). The present invention resides in the discovery that in the presence of certain catalysts it trimerizes to 1,2,4-trivinylbenzene, a new compound. This finding makes this interesting polyunsaturate accessible in two steps from low cost abundantly available acetylene.

The novel process involves contacting monovinylacetylene with a catalyst containing a metal hydride or an organo-metallic compound of a metal selected from the first to the third group of periodic table and a compound of a transition metal selected from the fourth to the eighth group of the periodic table in the presence of an inert organic solvent at a temperature in the range of −65 to +100° C.

In preparing the 1,2,4-trivinylbenzene a reactor is charged under nitrogen with an inert reaction medium, such as toluene and the catalyst is added. Thereafter monovinylacetylene is introduced at a rate low enough to permit the temperature selected for operation to be maintained. After all of the monovinylacetylene has been added, the reaction conditions are usually maintained for a while longer to insure high conversion of the vinylacetylene.

The process is generally conducted at atmospheric pressure under a blanket of nitrogen. However, it can also be carried out under externally applied pressures but in such event it is desirable to dilute the monovinylacetylene with an inert gas in order to minimize explosion hazards. As illustrated in the examples that follow, temperature is an important variable affecting the conversion of the monovinylacetylene to the desired 1,2,4-trivinylbenzene. In general, the lower the temperature the better the conversion. However, reaction rate decreases with decreasing temperatures. As a rule temperatures below −65° C. are not used because the reaction becomes too slow while above 100° C. the conversion of the monovinylacetylene to the desired 1,2,4-trivinylbenzene becomes impractically small. Thus the range −65° to 100° C. represents practical operating temperature conditions, with −30 to +25° C. representing the best balance of reaction rate and conversion to the desired product.

The catalysts used in the process of the present invention are combinations of two components. Component A is a metallic hydride or an organo-metallic compound, such as a metal alkyl or alkoxide of a metal from group I to III; and component B is a transition metal compound, such as, for example, a halide or alkoxide, of a metal from group IV through VIII.

Specific groups I to III metal hydrides useful as component A in the catalysts employed in the present invention are lithium, sodium, potassium, calcium, barium, strontium, magnesium, zinc, boron and aluminum hydrides. Among the specific organic derivatives of such metals which can be used are the metal alkyls, the metal alkoxides, and the alkyl metal halides. Examples of such are lithium butyl, potassium ethoxide, sodium methoxide, calcium isopropoxide, barium butoxide, ethyl aluminum chloride and bromide, butyl magnesium chloride, diethyl strontium, diethyl zinc, dibutyl magnesium, triisobutyl aluminum, triethyl aluminum, triamyl aluminum, tridecyl aluminum, trimethyl boron, and the like.

Illustrative of the transition metal compounds from groups IV through VIII which are suitable for purposes of this invention are $TiCl_4$, $TiCl_3$, $TiCl_2$, $TiF_4$, $ZrCl_3$, $ZrBr_2$, $FeCl_3$, $VOCl_3$, $VCl_5$, $MnCl_2$, $MnCl_3$, $MoCl_6$, $MoCl_5$, $CoCl_2$, $NiCl_2$, titanium tetraisopropoxide, manganese diheptoxide, manganese tributoxide, tantalum pentaethoxide, tantalum pentamethoxide, sodium zirconium nonamethoxide, $[NaZr_2(OCH_3)_9]$, iron diethoxide trimer, $[Fe(OC_2H_5)_2]_3$, and the like.

The preferred catalysts are combinations of a transition metal halide, such as a titanium halide, especially the chloride and a lower alkyl of a group I to III metal particularly alkyl aluminum compounds.

The proportions of catalyst component A to catalyst component B is not critical but the mol ratio generally used ranges between 5:1 and 1:5. The manner in which catalyst component A and catalyst component B interact to form the catalyst is not known. Merely contacting the two appears to be sufficient. The quantity of catalyst used must be sufficient to induce the trimerization at a practical rate under the temperature conditions used. An amount of catalyst in the range of 0.1 to 30% by weight of the monovinylacetylene and preferably 1 to 15% by weight of the monovinylacetylene is used.

The reaction is effected in the presence of an inert reaction medium. Hydrocarbons such as toluene, xylene, cyclohexane, decahydronaphthalene, etc., constitute the preferred media. The amount of reaction medium is not critical and it can equal or exceed the amount of monovinylacetylene used by a hundred or more times.

The examples which follow illustrate but do not limit the invetntion.

*Example 1*

Vinylacetylene (14.0 g.), scrubbed with 30% aqueous sodium bisulfite and with 20% aqueous sodium hydroxide, and dried with calcium chloride and anhydrous calcium sulfate, was distilled into a mixture of 250 ml. of toluene, 10 millimoles of aluminum triisobutyl and 2.5 millimoles of titanium tetrachloride over a period of 75 minutes. The temperature was gradually raised from 29–52° C. during this period. In isolating the product, methanol was added to destroy the catalyst and to precipitate methanol-insoluble products. Distillation of the filtrate gave 2.5 ml. of a product boiling at 90° C. at 5 mm. pressure. This corresponds to about a 10% conversion of vinylacetylene. Redistillation of this product gave a liquid distilling at 64° C. at 0.8 mm. pressure.

*Analysis.*—Calc'd. for $C_{12}H_{12}$: C, 92.31; H, 7.69; hydrogenation No. (grams of hydrogen absorbed/gram of sample), 0.0385. Found: C, 91.72; H, 8.07; hydrogenaton No. (grams of hydrogen absorbed/gram of sample), 0.0400, 0.0408.

The ultraviolet spectrum of the hydrogenated product indicated that at least 90% of the product was the 1,2,4-trivinylbenzene, along with small amounts of the 1,3,5- isomer. The infrared and nuclear magnetic resonance spectra were in good agreement with the 1,2,4-trivinylbenzene structure. The specific absorption coefficient of the product was $k_{2460 A.}=196$.

Example II

Monovinylacetylene (12.6 g.), scrubbed as described in Example I, was added to a mixture of 258 ml. of toluene, 8.1 millimoles of triisobutylaluminum and 2.5 millimoles of titanium tetrachloride at 0° C. over a period of 31 minutes. The temperature was maintained at 0° C. for an additional 130 minutes. About 30 ml. of methanol was added and the product distilled. There was obtained about 4.6 g. of 1,2,4-trivinylbenzene, corresponding to a conversion of 36%.

Example III

Monovinylacetylene (120 g.), scrubbed as described in Example I, was added to a mixture of 1000 ml. of toluene, 32 millimoles of triisobutylaluminum and 1.2 ml. of titanium tetrachloride at −10° C. over a period of 85 minutes. Methanol (600 ml.) was added ten minutes later and the product distilled. There was obtained about 15 g. of recovered vinylacetylene and 78 g. of 1,2,4-trivinylbenzene, corresponding to a conversion of 65% and a yield of 74%.

The 1,2,4-trivinylbenzene of this invention is an excellent cross-linking agent as shown by the following example wherein a film-forming ester is rendered insoluble.

Example IV

A mixture of 10 grams of polyethylene glycol sebacate, 2 grams of 1,2,4-trivinylbenzene and 0.12 gram of benzoyl peroxide was heated for 20 minutes at 90° C. under slight pressure. The product obtained was insoluble in solvents for the polyethylene glycol sebacate and had a high thermal resistance thus showing that it was cross-linked.

From Example V which follows it can be seen how the 1,2,4-trivinylbenzene of this invention can be converted to vinylnaphthalene by passage over a dehydrogenation catalyst while, under identical conditions, the known 1,3,5-isomer does not yield any vinylnaphthalene.

Example V

A 3-g. sample of 1,2,4-trivinylbenzene, prepared as in Example III, having a refractive index, $n_D^{25}$, of 1.6043 was passed through a 25-mm. tube packed with 10″ of 1% platinum-on-carbon pellets. The reactor was flushed with nitrogen and heated at 450° C. The 1,2,4-trivinylbenzene was passed over the dehydrogenation catalyst over a period of 15 minutes at 0.5 mm. pressure. A yellow oil collected in the solid carbon dioxide trap and amounted to one gram. The refractive index, $n_D^{25}$, was 1.5529, and its ultraviolet spectrum corresponded to that of a mixture consisting of 3% 2-vinylnaphthalene and 35% 2-ethylnaphthalene. Examination of its infrared spectrum confirmed this result.

Three grams of 1,3,5-trivinylbenzene having a refractive index, $n_D^{25}$, of 1.5886 (lit. 1.5967) and prepared as described in J. Am. Chem. Soc. 72, 2037 (1950), was passed through the equipment and catalyst under the conditions described in the above paragraph. Under these conditions no liquid product was collected in the solid carbon dioxide receiver.

The 1,2,4-trivinylbenzene of the present invention possesses drying and solvent resistance properties which, as shown in the following example, differ unexpectedly from those possessed by 1,3,5-trivinylbenzene.

Example VI

A 0.5-g. sample of the 1,3,5-trivinylbenzene, $n_D^{25}$ 1.5886, and 0.5-g. sample of 1,2,4-trivinylbenzene, $n_D^{25}$ 1.6043, were activated by addition of a drop of 2% cobalt naphthenate drier. Films were flooded on glass plates and set aside to air dry. After four hours, the 1,2,4-isomer was essentially tack-free while the 1,3,5-isomer was still sticky. After 20 hours, both films had dried to the touch. A drop of toluene was placed on each dry film and the drop wiped off after one minute. Visual examination showed that the 1,2,4-isomer film was more resistant to toluene than was the 1,3,5-film.

The embodiments of the invention in which an exclusive property or privilege is claimed are defined as follows:
1. 1,2,4-trivinylbenzene.
2. The process for preparing 1,2,4-trivinylbenzene comprising contacting monovinylacetylene with a catalyst consisting of (1) a group IV through VIII transition metal compound, said compound being selected from the group consisting of halides and alkoxides, and (2) a compound selected from the group consisting of lower alkyls, alkoxides, alkyl halides, and hydrides of a metal from group I to III, at a temperature in the range of −65° to +100° C.
3. The process comprising contacting monovinylacetylene with a catalyst comprising titanium tetrachloride and aluminum triisobutyl at a temperature in the range of −65° to +100° C. to produce 1,2,4-trivinylbenzene.

References Cited in the file of this patent

UNITED STATES PATENTS 2,721,189   Anderson et al. ........... Oct. 18, 1955

FOREIGN PATENTS 1,149,218   France .................. Dec. 23, 1957

OTHER REFERENCES

Dykstra: Journal of the American Chemical Society, vol. 56, 1934, pages 1625–1628.

Mowry et al.: Journal of the American Chemical Society, vol. 72, 1950, pages 2037–2038.